(12) United States Patent
Winbom (10) Patent No.: US 7,634,678 B2
(45) Date of Patent: Dec. 15, 2009

(54) APPLICATION SOFTWARE INITIATED SPEEDUP

(75) Inventor: Håkan Winbom, Sollentuna (SE)

(73) Assignee: OMX Technology AB, Stockholm (SE)

( * ) Notice: Subject to any disclaimer, the term of this patent is extended or adjusted under 35 U.S.C. 154(b) by 517 days.

(21) Appl. No.: 11/348,551

(22) Filed: Feb. 7, 2006

(65) Prior Publication Data
US 2007/0186123 A1   Aug. 9, 2007

(51) Int. Cl.
*G06F 1/08* (2006.01)
(52) U.S. Cl. .................. 713/501; 713/322
(58) Field of Classification Search .......... 713/322, 713/500, 501, 600, 601
See application file for complete search history.

(56) References Cited

U.S. PATENT DOCUMENTS

| | | | |
|---|---|---|---|
| 4,893,271 A * | 1/1990 | Davis et al. | ................. 713/501 |
| 5,630,148 A | 5/1997 | Norris | |
| 6,230,279 B1 | 5/2001 | Dewa et al. | |
| 6,622,254 B1 | 9/2003 | Kao | |
| 2002/0124197 A1 | 9/2002 | Atkinson | |
| 2003/0061523 A1 | 3/2003 | Stanley | |
| 2003/0097603 A1 | 5/2003 | Athas | |
| 2003/0140264 A1 * | 7/2003 | Kawano et al. | ............. 713/500 |
| 2004/0210779 A1 | 10/2004 | Wang | |
| 2005/0039067 A1 * | 2/2005 | Tsau et al. | .................. 713/600 |
| 2006/0026450 A1 * | 2/2006 | Bounitch | .................... 713/600 |

FOREIGN PATENT DOCUMENTS

| EP | 1 338 948 | 8/2003 |
|---|---|---|
| EP | 1 519 259 | 3/2005 |

OTHER PUBLICATIONS

ASUS HyperDrive description from ASUSTek Computer Inc. web site, no. date, 1 page.
Srinivasan et al., *The Case of Lifetime Reliability-Aware Microprocessors*, Proceedings of the 31$^{st}$ Annual International Symposium on Computer Architecture (ISCA'04), 2004, 12 pages.
Novakovic, *Dual core Pentium Presler XE runs fine at 4.26GH$_z$* on an Intel 975XBX board, Dec. 18, 2005, 3 pages.
International Search Report for International Application No. PCT/EP2007/050634 dated May 23, 2007.

* cited by examiner

*Primary Examiner*—Dennis M Butler
(74) *Attorney, Agent, or Firm*—Nixon & Vanderhye P.C.

(57) ABSTRACT

An instruction, processor, system, and method allow application level software to explicitly request a temporary performance boost, from computing hardware. Advanced management of a working frequency of a processor achieves the performance boost. Preferably, a processor with that advanced management and performance boost is implemented in an electronic exchange or another application where peak periods may occur.

23 Claims, 4 Drawing Sheets

APPLICATION SOFTWARE INITIATED SPEEDUP

FIELD OF THE INVENTION

The present invention relates generally to management of processor working frequency in computer systems and electronic devices.

BACKGROUND

There exist many different kinds of computer systems ranging from individual computers to distributed computer systems interconnected by one or more networks. An important problem for these systems and computers is that they may, at one point or another experience peak periods, which they may have a hard time handling. Usually the systems are designed to handle peak periods up to a certain level. This level is usually based on a prediction of a future traffic scenario in the system weighted against the hardware cost. Thus, when trying to estimate the capacity for a system there is a risk for underestimating the future traffic in the system which may result in a shut down of the system. An example of an incident where the capacity of the system was not enough happened at the Tokyo Stock Exchange (TSE) on 18 Jan. 2006. According to the article "Temporary Suspension of All Transactions" (TSE news), the stock exchange had to close in order to prevent a system crash.

Thus, there may be situations when the capacity of the system is not enough. Hence the systems are not able to, or have a hard time to handle for example all the requests sent by the users using the systems, or a hard time to send out a large amount of information. As a result of this, users may experience long waiting times for their requests to be processed and may become very frustrated because of this, or even worse the system may have to be shut down in order to avoid a crash.

Financial trading systems (electronic exchanges) receive many quotes/orders from traders and/or brokers trading in financial instruments, energy contracts and so forth. Examples of when peak periods can occur are during the auction period before opening of an exchange, or when a task is sent that may result in a processor demanding change in an orderbook, or information dissemination, or because something else happened such as a political statement or rumor in the news or any happening that can trigger an increase of quotes/orders sent from traders.

Other applications having heavy transactions and peak periods are bank systems, warehouse systems and Internet broker services.

One way to achieve increased performance of a computer is to hard-wire a processor so that it statically runs on a clock-speed higher than normal. (this is commonly referred to as "over-clocking"). This typically leads to heat problems since the computer system is operated continuously at this higher speed and is therefore not suitable for commercial systems that need to have a certain level of security. Hobbyists are often statically "over-clocking" their systems in order to increase the performance for gaming and so forth. Another problem with this approach is that it is not possible to lower the frequency in an easy way since it is done manually by hard-wiring.

Some computer systems use "variable" (clock) speed in order to preserve energy, reduce heat and related noise. One such technology is Intel's "speed step". However this technology has been applied to battery powered "lap top" computers and office space "desktop" computers for saving battery power and for noise reduction. In these examples it is the operating system and/or the "BIOS" which detects some level of inactivity by the user, and "slows" down the clock by a supervisor state instruction.

Supervisor state instructions are instructions only executable in "supervisor state" or some similar mode which is reserved for the operating system.

Hence, most computer chips can operate at a higher rate than specified by the manufacturer. However the above described techniques increases the risk for failure, mainly because of heat-related problems, but also because it is necessary to make physical changes to the mother-board of a computer in order to statically over-clock a processor.

The speed of a working frequency for a processor may be statically increased for example when a processor has slowed down the clock due to inactivity, and when it experiences activity, the OS speeds up the working frequency. However it only speeds up the frequency to a maximum rate specified by the manufacturer and only at times specified by manufacturers, and only after it experienced an increase in workload. This is an inefficient way of managing the working frequency of a processor since it takes a while for the processor to realize that it is under a heavy workload. The time for the processor to realize this may be rather long from a processor point of view.

Thus processors are managed very inefficiently which results in low capacity usage compared to what processors actually could deliver.

SUMMARY

Thus it is an object to provide at least a partial solution to some of the problems mentioned above.

It is further an object to provide a solution that increases the capacity usage of a processor.

It is further an object to provide a solution that brings about a performance increase of underlying hardware.

It is further an object to provide a solution so that application level software can request a performance increase from the underlying hardware.

It is further an object to provide a solution that changes the working frequency of a processor.

It is further an object to provide a solution that saves time for a user.

It is further an object to provide a solution that cuts the time for processor demanding executions.

It is further an object to provide a solution increasing the working frequency of a processor just before a processor demanding request arrives.

It is further an object to provide a solution that decrease the response time.

According to a first aspect, the above and other objects are fulfilled by a processor comprising:
  a frequency generating unit for generation of a variable working frequency,
  a memory comprising an instruction for changing the working frequency,
  an interface for receiving a user instruction, wherein the instruction for changing the working frequency is activatable via the interface by the user instruction sent from a user level application.

Thus the processor is programmed to:
  receive a user instruction via the interface from a user level application for changing the working frequency, and
  based on the user instruction, change the working frequency by using the instruction stored in the memory.

The above processor has the advantage that a user level application may directly request a performance increase, such as increasing the work frequency of the processor.

Usually an operating system when initiating a hardware operation has to progress through: user mode to OS mode transition, the OS executes the hardware instruction and then transition back to user mode (which may involve a scheduling decision, and possible dispatch of an other process). These steps may be referred to as overhead cost such as cost in time and cost in processor power and so forth. The above described transition process slows down a computer or a computer system. Therefore a processor according to the invention may be able to cut overhead and in this way make use of processor capacity currently not utilized and thereby deliver results faster compared to other processors.

For most computer systems a user level application may be the first line of early warning systems for e.g. a change in workload, since it is in the user application where users requests different operations/functionalities to be executed. A user level application may detect the need for speed-up in several different ways, for example when known processor demanding operations/functions are requested.

In the case the user level application is a server application the need for speed-up may be detected by for example an increase of the input queue.

Thus if a processor demanding operation/functionality is requested by a user, the user level application can send a speed-up user instruction to the processor and in this way prepare the processor for an upcoming increase in workload, by increasing the working frequency.

Preferably the user instruction is triggered and sent in the user application based on a user action. A user action may be any kind of action that a user may perform, either directly via an interface or indirectly based on the user action. For example a user action can be an action such as: trade action, delete action, amend action, screen update action, direct request of speed up action, this is not an exhaustive list, other actions not mentioned here may also be added in the list.

In an embodiment the user instruction may be triggered and sent by a user action belonging to a list, e.g. a "top-ten" list comprising the ten most processor demanding actions. Thus when a user executes an action, the system checks whether this action belongs to the list and if it does the system sends a speed-up user instruction. This list may be continuously updated and may be based on statistics from the system. Thus in a further embodiment, the invention may comprise a self learning function that updates the "top-ten" list. The "top-ten" list may comprise an arbitrary number of processor demanding actions and is thus not limited to ten. The length of the list may thus be decided by the context wherein the present invention will be used. Preferably this function would be application software controlled.

A user action can also be an action that is automatically executed by a server application. Thus when a server receives a task that has been sent from a user level application by a user, the server application on the server may request a change of the working frequency of the processor such as a speed-up request.

Thus a user level application can also be a server application. However in this case the server based user level application preferably has a software function that receives data from client computers and thereafter analyses the data in order to see if it comprises processor demanding tasks or instructions, and if it does, the server based user level application may request a speed-up of the working frequency of the processor that will handle the workload.

The processor preferably comprises a temperature sensor for measuring a temperature of the processor in order to optimize the working frequency based on the temperature and based on the user instruction. In this way it is possible to control the working frequency so that the processor performs at an optimal speed in relation to the temperature.

The processor may further comprise a counter for counting the number of instructions that has been executed in speed-up mode, and when the number of instructions executed in speed-up mode, reaches a predetermined threshold, the speed-up mode is "canceled" or lowered. In this way the temperature problem can be avoided since the threshold would preferably be set to a number that would not overheat the processor. Thus, this may be an alternative and/or complementary to heat sensing.

Hence, it would be possible to optimize the working frequency in such a way that if the user instruction would normally trigger a speed-up of the working frequency to e.g. 95% of its maximum potential, due to the temperature the increase would only be up to 90% of its maximum potential. This may be based on a function, for example a linear function or exponential function and so forth. Thus, instead of certain thresholds, a continuous control of the speed-up would be possible to achieve in this way.

The frequency generating unit may comprise two or more frequency generating devices producing different frequencies in order to generate the variable working frequency. In this embodiment the frequency generating unit preferably comprises a switch for selecting one of the different frequencies in order to generate the variable working frequency.

The frequency generating device may be a crystal that vibrates at a regular frequency when an electrical current is applied to it and in this way produces a clock frequency. However any other device able to produce a clock frequency that can be used in a processor may be used.

Furthermore the frequency generating unit may comprise a frequency generating device generating a frequency and a divisor for changing the frequency to the variable working frequency. Preferably the instruction according to the invention changes the working frequency by changing a divisor factor.

The divisor factor may be an integer or a floating point number by which the divisor can be controlled in order to obtain a variable working frequency.

The frequency generating unit may comprise a frequency generating device generating a frequency and control means for direct control of the frequency generating device in order to output a variable working frequency.

For example the control means could be a device generating a variable pressure to the crystal, or a device generating a temperature change of the crystal, and in this way the frequency of the crystal could be changed.

The processor may be implemented in an electronic device such as computers, servers or hand held and portable devices such as mobile phones, palm pilots, cameras or in any other electronic device where it may be necessary to obtain a performance increase during peak periods or for processor demanding instructions.

Such an electronic device has the advantage that it may request a performance increase of the underlying hardware in order to execute a processor demanding task. Thus it may deliver a result faster to a user since it is able to at a very early stage identify a processor demanding task that the user has requested.

In a preferred implementation the processor is used in an electronic exchange systems, examples of such systems are OMX systems CLICK™, SAXESS™ or in clearing systems such as SECUR™.

Thus an electronic exchange using a processor according to the above has the advantage that it may request a performance increase of the underlying hardware if/when it receives a processor demanding request. An example of such a processor demanding request may be a delete all order request for a trading firm or any other processor demanding request that may occur in an electronic exchange environment.

In a second aspect, the above objects are achieved by providing an instruction controlling working frequency in a processor, the instruction is stored in a memory of the processor and is activatable by a user level application for changing the working frequency.

Thus the above instruction has the advantage that it provides a solution that directly dramatically cuts overhead such as superfluous steps which causes additional cost such as cost in time and so forth. Thus the instruction makes it possible to, at an early stage, request a hardware performance change. In this way capacity currently not being used can be accessed.

Since the instruction doesn't have to be activated by the operating system when controlling the clock frequency it is possible to achieve for example an earlier speed-up of the processor.

Preferably the change of the working frequency is a temporary increase of the working frequency in order to handle a future increase in work load. However it may also be a decrease of the working frequency.

The frequency may be controlled in a way so as to optimize the usage of a processor. For example the speed of the processor may thus be decided based on a request sent from a user level application. However an additional functionality may optimize the usage of the processor even further based on heat generated from the processor. Hence, means for measuring the temperature may be necessary to use. Thus in order to avoid overheating of the processor the frequency can be decreased for a while and in this way keep the heat at an allowable level but at the same time running the processor at a maximum speed.

In a third aspect, the above and other objects are fulfilled by a user level application for trading, the user level application comprising program instructions for:

based on a user action, requesting a change of a working frequency of a processor in order to change performance of the processor.

The above user level application is preferably a trading application such as CLICK Trade™ for trading of commodities and/or financial instruments. Thus a software module installed in the front-end of a computer system, such as in a client computer.

However the user level application may also be any software module in an electronic exchange, such as matching module software or any other server based application. Thus a software module installed in the back-end of a computer system.

Some of the user actions that occur when a user trades by using a user level application, can result in a very processor demanding task being sent to the electronic exchange. When such a task is selected by a user, the user level application for trading may select a function comprising a speed-up request and send it together with the task, and in this way ask for a performance increase in order to execute the task faster.

Figure 8:
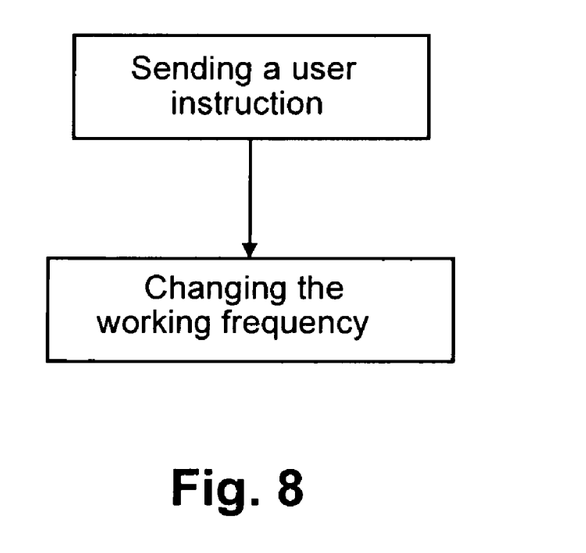
FIG. 8 Illustrates an example flow chart of operations.

In a fourth aspect illustrated generally in FIG. 8, the above and other objects are fulfilled by a method for increasing performance of a processor based on a prediction of a future change in workload, the processor comprising an instruction stored in a memory, the method comprising the steps of:

from a user level application, sending a user instruction for changing a working frequency of the processor, and based on the user instruction, changing the working frequency by using the instruction stored in the memory.

The above method has the advantage of requesting a performance increase of underlying hardware in order to achieve a faster execution of a processor demanding request.

Thus allowing the application to execute this particular instruction directly dramatically cuts the overhead. Usually user mode applications are prevented from direct hardware access for integrity reasons, however in this particular case the instruction would not change the result of a calculation, it would just deliver the result faster by changing the working frequency of a processor, thus it is safe to allow the application program to invoke this instruction directly without Operating System intervention.

The user level application may be a computer program product loaded on to a computer-readable data carrier or a computer program product downloadable via a network such as the Internet.

The technology can be used to design system which allows higher absolute peak loads, beyond the current maximum achieved. The invention may also improve cost efficiency by not having to design computer systems quite as large, because the system will be able to handle short term peak loads which are significantly higher than the sustained load capacity. It also allows the computing system to maintain reasonable response times even for costly transactions.

Figures are preferably schematically drafted in order to facilitate understanding. Therefore other designs that could be drafted in the same schematic way are implicitly also disclosed in this document.

DETAILED DESCRIPTION

Two new hardware instructions are proposed that are preferably accessible directly by application level software (SW), as opposed to access by BIOS/Operating system (OS) and device drivers.

A user mode instruction is an instruction which an application process may execute directly without assistance of the operating system. Usually hardware related instructions are only executable in "supervisor state" or some similar mode which is reserved for the operating system. Thus for an application to initiate a hardware operation one usually has to progress through:

User mode to OS mode transition,

OS executes the hardware instruction, and transition back to user mode (which may involve a scheduling decision, and possible dispatch of an other process)

The first instruction may be a Speed_Up(x %) instruction. This instruction preferably requests the hardware to speed up x % of the maximum possible speed-up for a preferred time. A maximum time would typically be determined by increased temperature of the CPU or surrounding chips, e.g. once a preset maximum temperature is reached, the speed-up is "canceled" or lowered. The maximum time could also be determined by a counter that counts the number of instructions that has been executed in speed-up mode, and when the number of instructions executed in speed-up mode reaches a predetermined threshold, the speed-up mode is "canceled" or lowered. The second instruction may be a reset instruction, for example Speed_Up_release( ), as means to allow the application to voluntarily reset to normal mode of execution. These two instructions are preferably user mode instructions.

In a multitasking, multi-CPU (Symmetric Multi-Processing—SMP) environment, it is envisioned that any Application level process or thread should be allowed to request Speed_up( ). Normally, it should not relinquish control of the CPU by issuing an OS and/or I/O call before it calls Speed_Up_Release( ). However, it could possibly be preempted by the operating system before it is finished. In these cases, the speed up state applies to the OS and/or other thread dispatched on this CPU until a heat limit, time limit, or other limit is reached.

The % argument to the Speed_Up( ) instruction allows the application to voluntarily request, e.g., just 50% of the possible speed up, with the assumption that it may be sustained for approximately twice as long, and/or that the next request will be able to get a speed up.

EXAMPLE

The following non-limiting example comes from the domain of "electronic" securities trading. In order to facilitate understanding of the example, some terms will first be defined:

Order: an instruction to make a transaction, i.e. to buy or sell a certain amount of a specific instrument at a given price. Orders are usually received from "investors", i.e. private investors or stock brokers.

Market Maker: An entity usually contracted by the operator of the trading system, for example a stock exchange, to maintain both buy and sell prices (and volumes) in the trading system for certain instruments. There may be some restrictions to this, e.g. that buy and sell prices should not differ more than a certain percentage.

Quote: an instruction to a trading system or an exchange containing both buy and sell "bids" for one or more instrument. Usually issued by market makers, and due to their nature (bids), transient in time.

Deal: a match between orders and/or quotes, comprising at least two trade orders (one buy, one sell) which make up the legs of the deal.

Order book: a table or a list in a trading system or an exchange, comprising all buy and sell orders as well as all quotes. There is essentially one order book for each tradable object.

Auction: orders are allowed to be stored in the order book during some time interval, but are not matched until some preset time or event occurs.

External events: e.g. if the central bank adjusts the interest rate, this is an external event which will cause almost all active traders to re-evaluate their positions in the market. Market makers may delete their quotes and submit new quotes, while "normal" traders may cancel their orders and submit new orders with different prices.

Wild card delete: this is a request by a participating firm to delete all their orders in all order books. This is a costly transaction because it directly implies searching all order books for orders by this user/firm and removes them. It also means that the market information system will have to become active and "broadcast" the new state of the market.

User mode instruction: A user mode instruction is an instruction which an application process may execute directly without assistance of the operating system. Usually hardware related instructions are only executable in "supervisor state" or some similar mode which is reserved for the operating system. Thus, a user mode instruction is an instruction which a user level application may execute directly without assistance of the operating system.

Usually most hardware related instructions are only executable in "supervisor state" or some similar mode which is reserved for the operating system. Thus for an application to initiate a hardware operation one usually has to progress through User mode to OS mode transition OS executes the hardware instruction Transition back to user mode (which may involve a scheduling decision, and possible dispatch of an other process). These steps may be referred to as "overhead" in this application. Allowing the application to directly execute such a hardware instruction dramatically reduces the overhead.

Usually user mode applications are prevented from direct hardware access for integrity reasons. But in this particular case the instruction does not change the result of the calculation. Rather, it just delivers the result faster. Thus, it is safe to allow the application program to invoke this instruction directly without operating system intervention.

Example 1

This scenario envisions that an external event causes, e.g., a market maker to request a delete of all his quotes in all orderbooks. The application software maintaining the order books calls the Speed_Up(100) function, iterates through the order books, and once it is done, calls Speed_Up_Release( ). Using these two instructions, this delete operation can finish in 20% less absolute time as compared to being handled by the OS, which is a very significant improvement.

Even if the Speed_Up( ) state is canceled before the wild card delete finishes, e.g., due to thermal reasons, it would still be a beneficial improvement.

Market maker firms using automated quote engines are very sensitive to increased response times; in fact, they may treat increased response time as an external event which causes them to issue "wildcard delete" transactions. Indeed, if Market Maker firm 1 issues a wild card delete, and this causes response times to deteriorate, this may cause other market maker firms to also issue "wildcard delete" transactions, aggravating the issue.

Example 2

Online auction for an instrument. In this case, it is a highly CPU intensive job to scan the order book for matching orders and quotes, and thus, it is ideal for use of Speed_Up(100) followed by Speed_Up_release( ) once done.

Example 3

High Trade Rate

In some exchanges the order books may be filled with large amounts of "retail" orders (each with low volume). Suddenly, a large participant e.g. a bank decides to buy/sell a huge volume of a particular instrument such that one deal can generate thousands of trades. This requires a burst of CPU intensive work to finish this processing, and thus, is also ideally suited to Speed_Up( )/Speed_Up_Reset( ).

Figure 1:
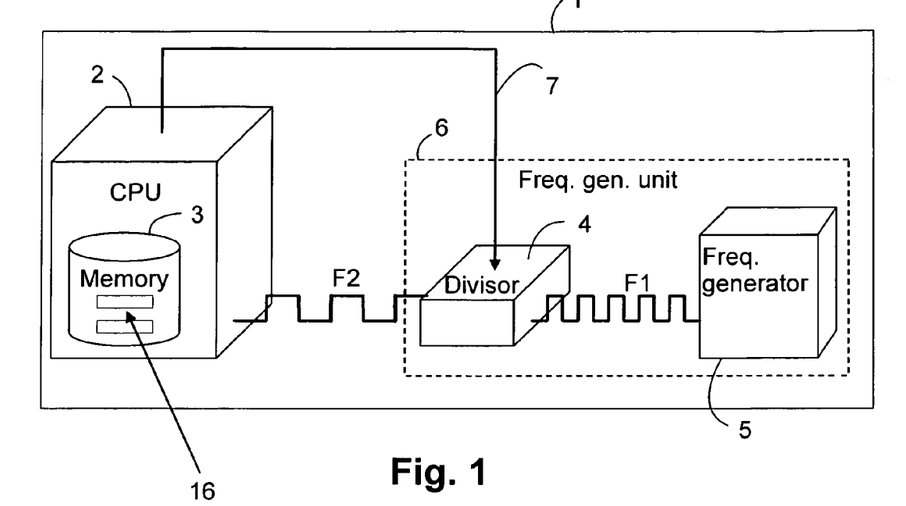
FIG. 1 Illustrates an overview of the system comprising a CPU, a divisor and a frequency generating unit, wherein the CPU has a memory comprising at least one instruction.

FIG. 1 illustrates an overview of an example embodiment of a system that comprises a CPU 2, a memory 3 comprising instructions 16, and a frequency generating unit 6 comprising a divisor 4 and a frequency generator 5. Furthermore, FIG. 1 illustrates a first frequency F1, a second frequency F2, and a control connection 7 for sending control commands from the CPU to the divisor so as to change the working frequency F2.

Figure 7:
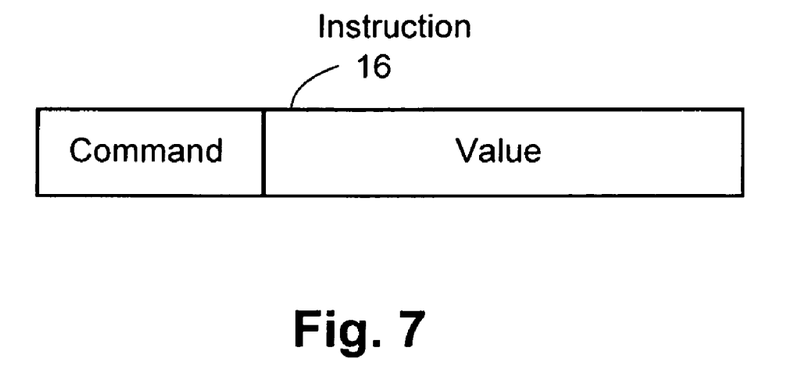
FIG. 7 Illustrates an example instruction.

An instruction 16 such as that shown in FIG. 7 preferably comprises a command and a value. The command may be of the type Speed_Up or Speed_Up_release as described above, and the value may be a percentage of the maximum possible speed, also described earlier.

Figure 2:
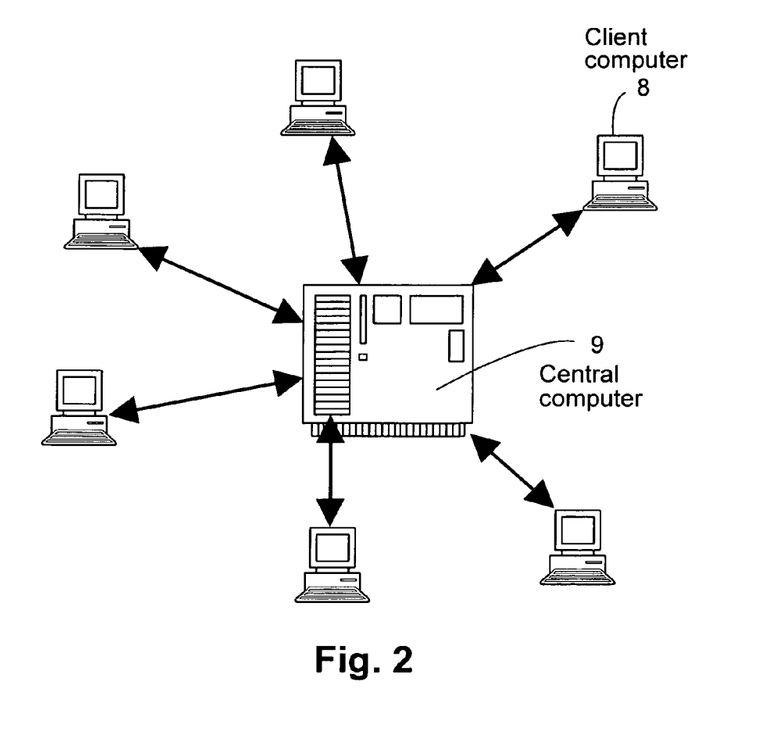
FIG. 2 Illustrates a central computer system comprising the electronic exchange and client computers comprising e.g. trading applications and or clearing applications.

FIG. 2 illustrates a distributed computer system comprising client computers 8 and a central computer 9. The client computers 8 and the central computer 9 may be interconnected by any kind of network such as the Internet, WAN, LAN, or direct connections such as P2P. Furthermore, wireless communication may be used, for example when the client computer 8 is a hand held electronic device such as a Palmpilot, mobile phone or a portable computer. FIG. 2 illustrates a star network but any other type of network may be used, for example, a ring network, bus network, and so forth. Furthermore, the communication may be routed over nodes not shown in FIG. 2. Secure channels may be necessary to establish between the client computers 8 and the central computer 9.

The central computer 9 may perform different types of server applications. As an example, the central computer 9 comprises an electronic exchange comprising a common database that further comprises market, product, user and transaction information necessary to operate an electronic exchange. Furthermore the central computer 9 may comprise other subsystems that are useful for an electronic exchange. Some example subsystems are an information dissemination system that processes and broadcasts information about trades and deals, a market place subsystem that manages the exchange's central order book, and so forth. An example of an electronic exchange is the CLICK™ system manufactured by OMX Technology.

Figure 3:
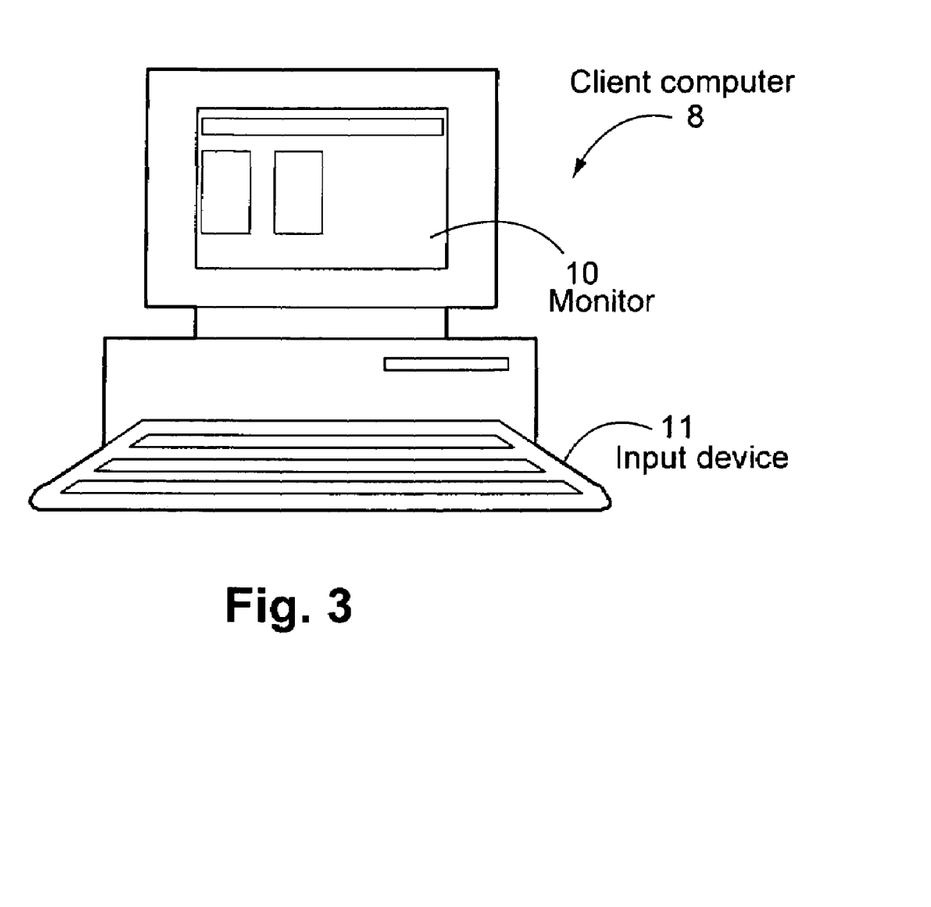
FIG. 3 Illustrates a client computer comprising a user level application and its user interface whereby a user may execute an instruction.

FIG. 3 illustrates a client computer 8 comprising a user interface preferably having two parts: a monitor 10 and an input device 11. However the user interface may be a touch screen and in this case the two parts are integrated. The monitor 10 may be any type of device that is able to present information to a user, such as an LCD display, plasma screen and so forth. The input device 11 may be any type of input device such as a keyboard, mouse, joystick or a keyboard specially designed for e.g. trading. As described above the client computer may be any kind of electronic device such as a mobile phone, Palmpilot and so forth that is able to communicate with other electronic devices over a network or by wireless communication.

Figure 4:
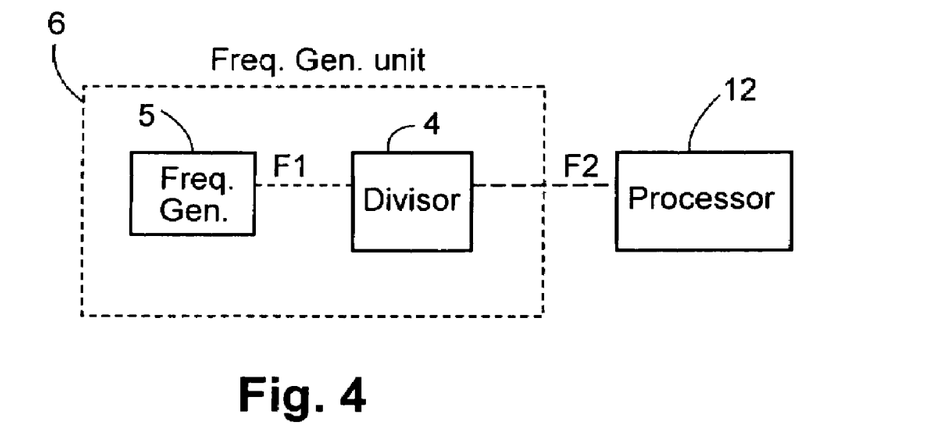
FIG. 4 Illustrates a first example embodiment of a frequency generating unit connected to a processor.

FIG. 4 illustrates an example embodiment of a frequency generating unit 6 connected to a processor 12. Preferably, the frequency generating unit 6 comprises a frequency generator 5 and a divisor 4 for changing the frequency generated by the generator 5. The generator 5 generates a first frequency F1 which is changed in to a working frequency F2 that is sent to the processor.

Figure 5:
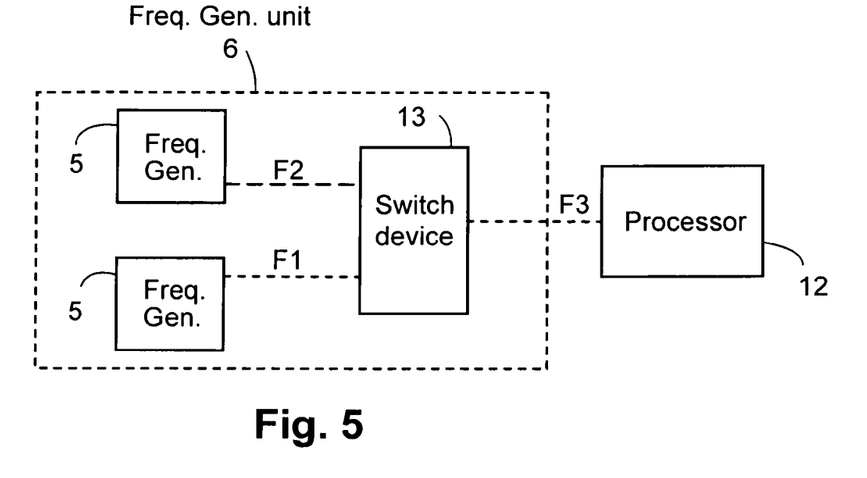
FIG. 5 Illustrates a second example embodiment of a frequency generating unit.

FIG. 5 illustrates a second example embodiment of a frequency generating unit 6 connected to a processor 12. In this embodiment, the generating unit 6 preferably comprises two frequency generators 5 and a switch device 13. Each frequency generator 5 preferably produces a frequency having a different frequency from the other frequency generator, e.g., a first and a second frequency F1, F2. The switch 13 may switch between the most suitable frequency based on an instruction from a user level application, and in this way, a third frequency F3 (working frequency) may be sent to the processor 12. The switch 13 is preferably controlled by instructions sent from the processor 12.

The number of frequency generators is not limited to two; an arbitrary number of generators may be used. In a further example embodiment, a divisor may also be connected to at least one of the lines which would provide the possibility of changing either the F1 or F2 or F3 or all of them depending on where the divisor(s) is placed in the system.

Figure 6:
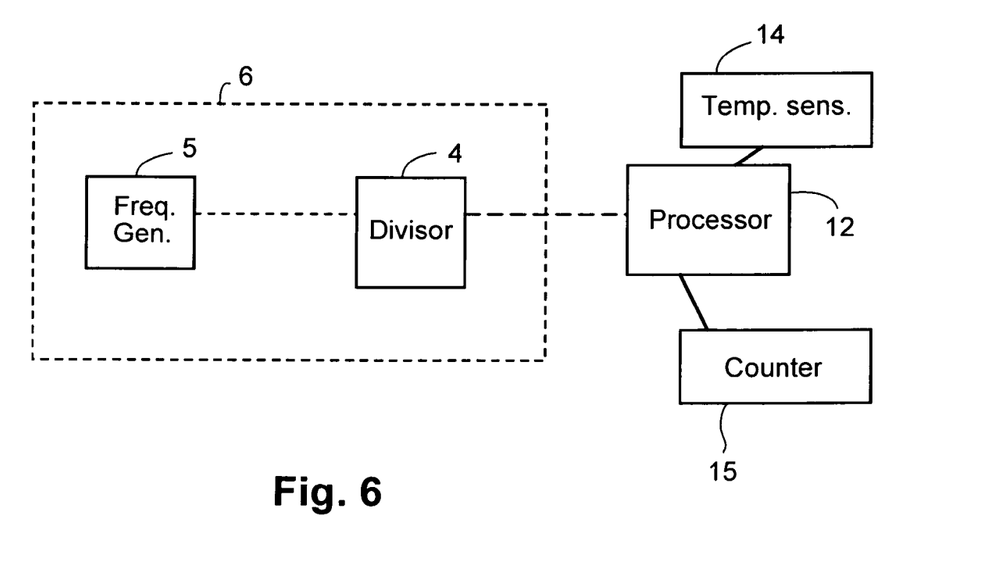
FIG. 6 Illustrates an example embodiment of the system comprising a temperature sensor.

FIG. 6 illustrates a third example embodiment of the system wherein a temperature sensor 14 is connected to the processor 12 or in the vicinity of the processor such as to the CPU or motherboard. The sensor 14 may be used in order to monitor the temperature of the processor 12 so that the temperature stays within allowable limits. Preferably the temperature may be controlled by increasing or decreasing the working frequency of the processor 12. However the temperature may also be controlled by increasing an air flow if the processor is chilled by air, or by increasing a flow of a liquid if the processor is chilled by a liquid.

In a further example embodiment, the system may comprise a counter 15 for counting the number of instructions that is executed by the processor 12 as described earlier in the text.

In the above description the term "comprising" does not exclude other elements or steps and "a" or "an" does not exclude a plurality.

Furthermore the terms "include" and "contain" does not exclude other elements or steps.

The invention claimed is:

1. Apparatus comprising:
   a processor arranged to operate in a user mode in which a user level application process may directly execute a user mode hardware instruction without having to issue a software program call,
   a frequency generating unit for generating a variable working frequency for operating the processor, and
   a memory for storing a user mode hardware instruction for increasing the working frequency of the frequency generating unit to an increased working frequency, and
   wherein the user mode hardware instruction for increasing the working frequency to the increased working frequency is activatable by the user level application process and is executable by the processor to directly control the frequency generating unit without the user level application process having to issue a software program call to increase the working frequency of the frequency generating unit.

2. The apparatus according to claim 1, further comprising a temperature sensor for measuring a temperature associated with the processor operating at the increased working frequency, and wherein the processor is arranged to automatically reduce the increased working frequency when a measured temperature associated with the processor exceeds a predetermined temperature.

3. The apparatus according to claim 1, wherein the frequency generating unit comprises two or more frequency generating devices for providing the increased working frequency.

4. The apparatus according to claim 3, wherein the frequency generating unit further comprises a switch for selecting one of the different frequencies in order to generate the increased working frequency.

5. The apparatus according to claim 1, wherein the frequency generating unit comprises a frequency generating device generating a frequency and a divisor for changing the frequency.

6. The apparatus according to claim 1, wherein the frequency generating unit comprises a frequency generating device for generating a frequency and a controller for direct control of the frequency generating device in order to output the increased working frequency.

7. An electronic device comprising an apparatus according to claim 1.

8. An electronic exchange comprising an apparatus according to claim 1.

9. The apparatus according to claim 1, wherein the change of the working frequency is a temporary increase of the working frequency in order to handle a future increase in work load,
wherein the processor is arranged to execute another user mode hardware instruction for decreasing the working frequency of the frequency generating unit after the increased work load is finished without the user level application process having to issue a call to the operating system.

10. The apparatus according to claim 1, wherein the user mode hardware instruction comprises a command part and a value part comprising data for changing the working frequency in the processor.

11. An apparatus according to claim 1, wherein the increase in working frequency is based on a prediction of a future change in workload for the processor such that the processor processes the workload at the increased working frequency which is higher than a maximum working frequency specified by a manufacturer of the processor.

12. An apparatus according to claim 1, wherein the processor is arranged to operate in a supervisor mode in which supervisor mode instructions are reserved for execution via an operating system of the processor and cannot be directly executed from the user mode, and wherein the software program call is a call to the operating system.

13. An apparatus according to claim 1, wherein the processor is arranged to automatically decrease the increased working frequency when more than a predetermined number of instructions are executed at the increased working frequency.

14. A user level trading application stored on a computer readable storage medium, the user level trading application comprising program instructions which when executed by a computer controls the computer to execute a user level hardware instruction from the user level trading application to directly control a frequency generating unit in order to increase a working frequency at which a processor of the computer performs processing tasks without the user level trading application having to issue a software program call.

15. A computer readable storage medium storing a user level trading application according to claim 14, wherein the user level application is chosen from a group of applications comprising:
a server application, and
a user application.

16. A computer readable storage medium storing a user level application for trading according to claim 14, wherein the user level trading application further controls the computer, based on a prediction of a future increase of workload on the processor, to issue the user level hardware instruction to increase the working frequency of the processor.

17. A computer readable storage medium storing a user level application for trading according to claim 14, wherein the increase in working frequency is based on a prediction of a future change in workload for the processor such that the processor processes the workload at the increased working frequency which is higher than a maximum working frequency for the processor specified by a manufacturer of the processor.

18. A method for increasing performance of a processor based on a prediction of a future change in workload, the processor comprising an instruction stored in a memory, the method comprising the steps of:
predicting a future increase in a workload of the processor,
in response to the prediction, a user level application sends a user mode hardware instruction from an application process directly to a frequency generating unit for changing a working frequency of the processor, and
wherein the user mode hardware instruction directly controls the frequency generating unit to increase the working frequency of the processor,
wherein the user mode hardware instruction is sent and executed without the user level application process having to issue a software program call.

19. A computer-readable storage medium storing a computer program which when executed by a computer performs the steps according to claim 18.

20. A method according to claim 18, wherein the processor processes the workload at the increased working frequency which is higher than a maximum working frequency for the processor specified by a manufacturer of the processor.

21. A method according to claim 18, wherein the processor also operates in a supervisor mode in which supervisor mode instructions are reserved for execution via an operating system of the processor and cannot be directly executed from the user mode, and wherein the software program call is a call to the operating system.

22. A method according to claim 18, further comprising automatically decreasing the increased working frequency when more than a predetermined number of instructions are executed at the increased working frequency.

23. A method according to claim 18, further comprising measuring a temperature associated with the processor operating at the increased working frequency, and
automatically reducing the increased working frequency when a measured temperature associated with the processor exceeds a predetermined temperature.

* * * * *